United States Patent [19]

Worchesky et al.

[11] Patent Number: 5,566,382
[45] Date of Patent: Oct. 15, 1996

[54] MUTIPLE-CLOCK CONTROLLED SPATIAL LIGHT MODULATOR

[75] Inventors: Terrance L. Worchesky, Columbia; Kenneth J. Ritter, Sykesville, both of Md.; Robert J. Martin, Orlando; Barry L. Lane, Seminole, both of Fla.

[73] Assignee: Martin Marietta Corp., King of Prussia, Pa.

[21] Appl. No.: 570,279

[22] Filed: Dec. 11, 1995

[51] Int. Cl.$^6$ .......................... G02B 26/00; G01S 13/00
[52] U.S. Cl. .......................... 359/237; 359/259; 342/25; 342/54
[58] Field of Search ....................... 359/237, 238, 359/259, 263, 285, 325; 342/24, 54

[56] References Cited

U.S. PATENT DOCUMENTS

| | | | |
|---|---|---|---|
| 4,514,059 | 4/1985 | McDonnell | 350/162.16 |
| 4,962,382 | 10/1990 | Lee | 342/372 |
| 5,187,487 | 2/1993 | Riza | 342/372 |
| 5,307,073 | 4/1994 | Riza | 342/372 |
| 5,327,274 | 7/1994 | Yamaguchi | 359/107 |
| 5,365,237 | 11/1994 | Johnson et al. | 342/179 |
| 5,488,504 | 1/1996 | Worchesky et al. | 359/248 |

*Primary Examiner*—Mark Hellner
*Attorney, Agent, or Firm*—W. H. Meise; D. W. Gomes; G. Chin

[57] ABSTRACT

A SAR radar has an optical processor which uses an electrical-signal-to-light modulator. The modulator includes a tapped delay line which may be either analog or digital, and the signals tapped from the delay line are applied to an array of temporary storage elements, which in the case of analog signals may be a capacitive sample-and-hold, or for digital signals may include storage registers. In order to improve the signal-to-noise ratio (SNR) by comparison with a processor using an acoustic modulator, the signals tapped from the delay line are sampled at a display sampling rate, which is very low by comparison with the signal sampling rate or the highest frequency of interest, and the sampled signals are held until the next following display rate pulse. The signals held in the temporary storage elements are applied to the modulator elements, so that the optical pattern remains fixed for relatively long periods of time during which the optical processing can integrate photons for improved SNR.

16 Claims, 5 Drawing Sheets

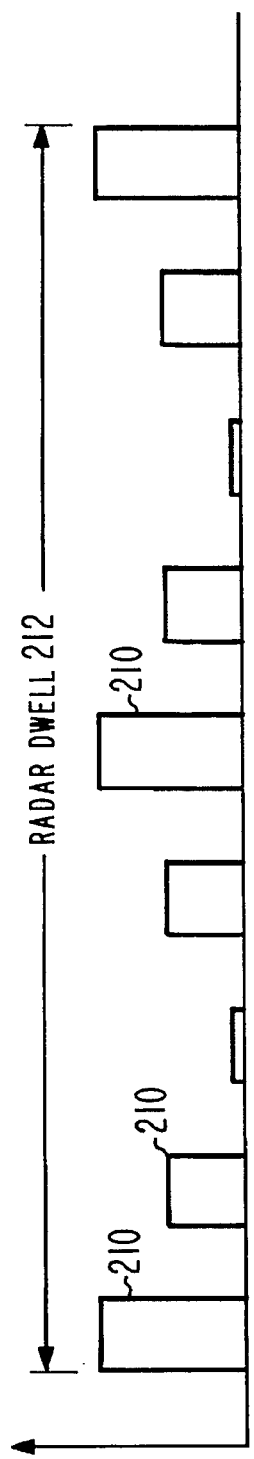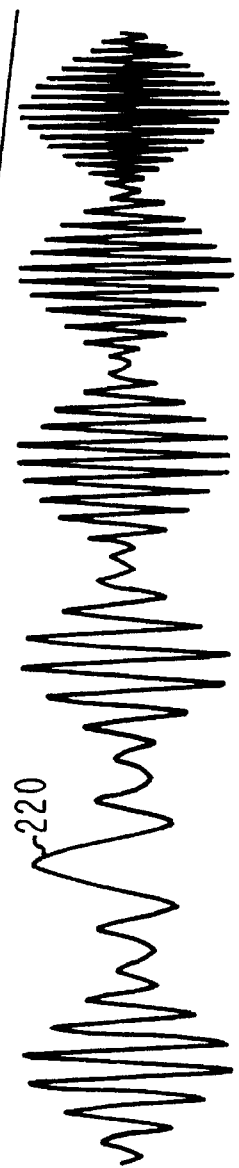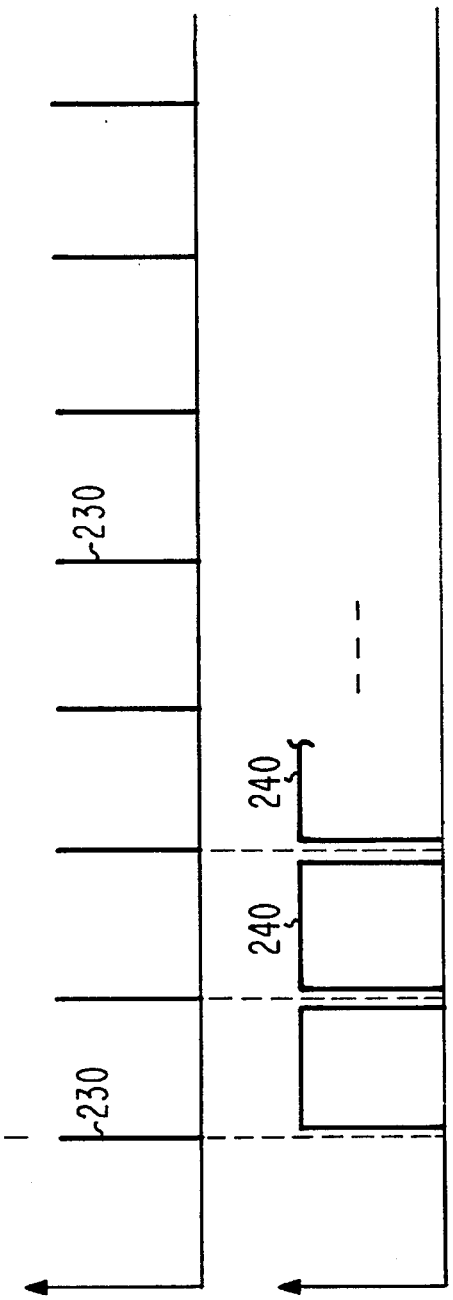

5,566,382

MUTIPLE-CLOCK CONTROLLED SPATIAL LIGHT MODULATOR

FIELD OF THE INVENTION

This invention relates to spatial light modulators, and particularly to such modulators which are controlled by a sampling clock and a strobe signal, and which find use in optical signal processing, such as that used for synthetic-aperture radar systems.

BACKGROUND OF THE INVENTION

FIG. 1 is a simplified block diagram of a synthetic aperture radar (SAR) system synthesized from the prior art. In FIG. 1, a vehicle (not illustrated) such as an airplane bears a fan-beam transmit-receive antenna 10 which produces a footprint on the ground being imaged. Antenna 10 is coupled to a transmit-receive (TR) device 12, which allows the same antenna to be used for both transmission and reception. TR device 12 is in turn coupled to a transmitter 14 and to a receiver 16. Transmitter 14 produces transmit pulses at a rate and with a duration controlled by a timing generator or pulse source 18, applied over a path 19a. Such pulses typically have a pulse repetition rate in the kilohertz or tens of kilohertz range, and a duty cycle in the vicinity of 50%, but other characteristics may be used. The transmit pulses are illustrated as a pulse train 210 in FIG. 2a. The pulses from transmitter 14 are coupled through TR device 12, and are transmitted by antenna 12 toward the ground. The pulse energy arriving at the ground has an elliptical footprint, as suggested by 310 of FIG. 3. In FIG. 3, the vehicle carrying the SAR antenna, transmitter and receiver is illustrated as a block 312, moving in the direction of arrow 314 with velocity v. The altitude of the aircraft is designated h, and the distance from the sub-aircraft point to the target region is designated $X_0$. The range is readily determined, and is illustrated as $R_0$. Those skilled in the art realize that the footprint 310 moves with time as the vehicle carrying the radar system moves.

The energy which falls on the footprint of FIG. 3 is reflected, depending upon the characteristics of the particular portions of the terrain and any targets thereon. A portion of the reflected energy is returned to the antenna in the form of complicated modulation of the original pulse, and is illustrated as 212 in FIG. 2b. The modulated pulse information returned to antenna 10 of FIG. 1 is coupled by TR device 12 to receiver 16, which performs analog signal processing as may be required, such as low-noise amplification, frequency conversion, and the like, and couples the resulting received signal to a digitizer, illustrated as 20. Digitizer 20 converts the received signal to digital form, and applies the resulting digital received signal to a SAR processor illustrated as a dash block 22. SAR processor 22 performs various types of processing for converting the received signals into a representation of the region being imaged by the SAR radar system, and couples those image-representative signals to an image processor illustrated as a block 24, which adjusts the signals for best display, as for example by allowing selection of appropriate contrast, colors, or the like, or for actual processing such as for correlation of the current image with a stored image.

Within SAR processor 22 of FIG. 1, the digitized signals are first applied to a first processor (PROC) 30, which is used when high-resolution images are to be generated. High resolution is achieved by breaking the received signal samples into sub-sets, and further processing the subsets to generate multiple sets of image data, from which fine detail can be extracted. One simple way to divide the signal samples into different sets is to multiplex the received signals sequentially, in the order of reception, to a plurality of channels, illustrated as channel 1 (C1) ... channel N (CN) in FIG. 1. Each of the sets of samples traverses its own SAR processor 34a, ... 34N, and the resulting images are recombined by a second processor 32. The high-resolution image-representative data at the output of processor 22 is coupled to image processor 24, for further adjustment. In the event that less resolution is needed, a single SAR processor, such as SAR processor 34a, may be used, in which case processors 30 and 32, and the other illustrated SAR processors 34, may be dispensed with.

High-resolution SAR images are not now generated aboard the aircraft which does the SAR sensing. Instead, the digitized information from digitizer 20 of FIG. 1 is transmitted from the sensing aircraft to a ground station, and the computations are made by ground-based computers. It would be desirable to be able to include the computers in the aircraft, so that the images could be viewed directly as the signals are received, and to obviate the need for high-bandwidth communications from aircraft to ground, but the required computations are sufficiently complex so that ground-based computers are more advantageous.

FIG. 4 is a simplified block diagram of an optical SAR processor. In FIG. 4, a spatial light modulator (SLM), described in greater detail in FIG. 5, receives the digitized return signals from digitizer 20 of FIG. 1, and produces a diffraction pattern as described below, which propagates across the length of the SLM. The dimensions of the SLM are selected so that the signals applied to one end of the SLM propagate to the other end of the SLM in one period of the transmitted pulses 210 of FIG. 2a. That is, the returned signal resulting from each transmitted pulse exactly fills the length of the SLM. Naturally, some margin or leeway must be allowed for SLM control time and for errors. An example of the pattern of refraction across the surface of SLM 410 resulting from one transmitted pulse is illustrated as 412 in FIG. 4.

Spatial light modulator 410 of FIG. 4 is reflective, as described below. A source of light such as a laser 414 in FIG. 4 produces a beam 416 of coherent light, which is processed by an optical system 418, if necessary, for expanding the beam to the dimensions of the active portion of spatial light modulator 410. The expanded beam 416 of light is reflected and directed toward spatial light modulator 410, where it is modulated by the pattern of refraction then existing or propagating on its surface due to the received signal. The modulated beam reflected or diffracted from the surface of SLM 410 is applied to half-silvered mirror 426, and passes through the mirror to a Fourier transform lens 428. Lens 428 performs a Fourier transformation to produce a Fourier-transformed image at the F-T plane 430. A mask, illustrated in exemplary form as 432, lies in the FT plane 430, and allows only a portion of the transformed light portion to pass. In effect, mask 432 represents a spatial filter in the Fourier plane. The filtered, transformed light exiting mask 432 is applied to an imaging lens, which images the Fourier plane onto the surface of a detector 436, which may be an array of photosensors, or preferably a charge-coupled imager device (CCD) or camera. An interference pattern is formed at the surface of detector 436 by combining the light from imaging lens 434 with unmodulated light from laser 414. The combining is accomplished by a mirror 438 and a light combining half-silvered splitter 440, which couple light beam 422 to the surface of light sensor array 436. The purpose of the interfering light is to allow phase information to be recovered, which provides an improved image. An electrical signal representing the image applied to detector array 436 is generated on an output signal path 442. As so far described, the arrangement of FIG. 4 includes a single channel, which recovers amplitude or phase information from the received signals, but not both. In the arrangement of FIG. 4, mask 432 is selected, in known fashion, to recover amplitude information. A second channel is provided by a light splitter 450 and a mirror 452, which couple a further beam 454 to a second Fourier transform lens 456. Lens 456 performs a Fourier transform to a Fourier plane 458. A second mask or filter (not illustrated), which is similar to, but not identical with, mask 432, is placed at the second Fourier plane 458, to extract phase information from the received signal. The phase mask filters the Fourier-transformed light, and the resulting image is focussed onto a second light detector array 460 by an imaging lens 462. An interference is provided by a sample of the unmodulated coherent light coupled to the surface of detector 460 by a splitter 464. The arrangement of FIG. 4 with the inclusion of the second channel is desirable when only a single SAR processing channel is to be used.

FIG. 5 is a simplified representation of an acoustic light modulator which may be used in the arrangement of FIG. 4. In FIG. 5, modulator 410 is a lithium niobate crystal 512 with an electrical-to-acoustic transducer 510 at one end thereof. Transducer 510 includes a pair of electrodes to which the received signal is applied, to create an acoustic wave which propagates across the surface of the crystal in the direction of arrow 514. The acoustic surface wave causes changes in the index of refraction, illustrated as a pattern of transverse lines 516, which propagate across the surface of the crystal. Ideally, the acoustic waves are dissipated upon reaching the end of the crystal, so as not to reflect and interact with the pattern of the index of refraction across the surface. The pattern of index of refraction represents the amplitude of the received signal for a period of time. Unfortunately, the acoustic modulator is subject to a number of imperfections, including "spreading" of the surface wave into the bulk crystal, as suggested by the "frequency and spatial dispersion" arrow 518, and reflections from the end of the crystal. The length of the crystal is selected in conjunction with the pulse repetition rate of the transmitted pulses, so that the time required for an acoustic wave to propagate across the crystal is equal to the duration of a transmitted pulse. Thus, as the acoustic wave propagates across the surface of modulator 410 of FIG. 5, there is an instant at which the entire surface of the crystal is "filled" with a pattern of indices of refraction which arise from the returned signals caused by one transmitted pulse. At that instant, laser light 414 of FIG. 4 is pulsed ON, to illuminate the surface of modulator 410, and to thereby generate the modulated light pattern required for the desired Fourier processing, illustrated in FIG. 5 by arrows 522, representing different targets.

The frequency content of the returned signals may extend above the tens of megahertz, and even into the hundreds of megahertz. The ability to process signals with such a bandwidth is one of the advantages of the optical signal processing described in conjunction with FIG. 4. As a result of the very large bandwidth of the processing, the shortest-duration pieces of information existing on the surface of modulator 410 of FIG. 5 are a fraction of the duration of the highest frequency being processed. If the highest frequency being processed is 100 MHz., the duration of one cycle at the highest frequency is ten nanoseconds, and the shortest-duration sample must be no longer than five nanoseconds. Thus, in order to fully process the returned signal appearing on the surface of acoustic modulator 410 of FIG. 5, the duration of the light pulse must not exceed five nanoseconds for a useful bandwidth of 100 MHz. Of course, the actual duration of the pulse of light depends upon the bandwidth. A coherent light pulse of such short duration is difficult to produce, requiring very specialized laser sources, and also difficult to process, because of the losses inherent in the optical components, which reduces the amount of light available at the detectors 436 and 460 of FIG. 4. Unfortunately, it is not possible to keep the laser light source 414 ON for a longer period of time than that allowed by the bandwidth limitation mentioned above in order to allow more photons to be integrated by each photosensor of the detectors, because longer-duration light pulses allow the pattern on the surface of the light modulator to change during the pulse. These changes occur because the acoustic waves continue to propagate during illumination, with the result that the image becomes "blurred". When the pulses of light are very short, the resolution is high, but the small amount of light results in poor signal-to-noise ratio (SNR), and when the pulses of light are longer, the signal-to-noise is improved, but the image resolution suffers. Improved SAR processors are desired.

SUMMARY OF THE INVENTION

A light modulator according to an aspect of the invention includes a line array of light modulator elements, each of which includes an input signal port, for controlling light falling thereon under the influence of a signal voltage applied to the input signal port of the modulator element. A tapped delay line has an input port coupled to a source of electrical signal to be displayed, and also includes a plurality of taps, for generating electrical signals at each of the taps which represent the signals applied to the input port of the delay line, delayed by a particular time delay. The intertap delay may be equal for all of the taps. A coupling arrangement includes a strobe input port, and is coupled to the taps of the delay line and to the input signal ports of the array of light modulator elements, for simultaneously sampling the signal occurring at all of the taps under the control of a strobe signal applied to the strobe input port. This generates an array of a plurality of sampled signals equal to the number of taps. The coupling arrangement applies the array of sampled signals to the input signal ports of the line array of modulator elements, and holds the sampled value until a later strobe signal is applied to the strobe input port. A source of strobe signals is coupled to the strobe input port of the coupling arrangement, for periodically applying the strobe signal to the coupling arrangement, for causing electrical signals applied to the input port of the tapped delay line to be displayed by the line array of light modulator elements. The delay line may be an analog delay line, or it may be digital. If analog, it may be a conventional electromagnetic transmission line, or an acoustic transmission line, or it may be a time-sampled bucket-brigade charge-coupled device. If digital, it may be an array or a cascade of shift registers, which may have a depth of two or more bits. In one embodiment of the invention, the delay line is a six-bit-deep cascade of shift registers clocked by a high-speed clock. The light modulator may be of any type; in one embodiment of the invention it is a solid-state array of Fabry-Perot cavity modulators, in which the active or voltage-variable portion comprises quantum wells. According to an aspect of the invention, the coupling arrangement includes a plurality of temporary storage or sample-and-hold arrangements or circuits, one coupled to each tap of the delay line. In the case of an analog signal, the sample-and-hold circuits may be capacitive, and in the case of a digital signal, the sample-and-hold circuits may be storage registers. When the stored signal is in multibit digital form, the coupling arrangement further includes a digital-to-analog converter, for generating an analog signal from the stored multibit signal for application to the modulator element.

An optical processor according to the invention includes a modulator as described above, and includes the light modulator itself, which in turn includes: (a) a line array of light modulator elements, each of which includes an input signal port, for controlling light falling on the modulator elements under the influence of signal voltage applied to the input signal port of each modulator element: (b) a tapped delay line including an input port coupled to a source of electrical signal to be displayed, and also including a plurality of taps, for generating electrical signals at each of the taps which represent the signals applied to the input port of the delay line, delayed by a sampling time delay; and (c) a coupling arrangement including a strobe input port, which coupling arrangement is coupled to the taps of the delay line and to the input signal ports of the array of light modulator elements, for simultaneously sampling the signal occurring at all of the taps under the control of a strobe signal applied to the strobe input port of the coupling arrangement, to thereby generate a plurality of sampled signals, one for each tap. The sampling strobe signal is very short, and results in a sample of the received signal pattern which existed on the tapped delay line at the instant that the delay line was "full" of the received signals arising from a single transmitted pulse. The sampled signals are held in storage, and are continuously applied to the input signal ports of the line array of modulator elements until a later strobe signal is applied to the strobe input port. The optical processor further includes a coherent light source for producing coherent light under the control of an ON-OFF control signal applied to an ON-OFF control port. The optical processor further includes an arrangement for illuminating the modulator with the coherent light when the coherent light source is ON, as a result of which the modulator modulates the coherent light to produce modulated light, whether reflected or transmitted. An arrangement is provided for transforming the modulated light to produce transformed light, for spatially filtering the transformed light to produce filtered transformed light, and imaging the filtered transformed light to produce imaged light. In one embodiment of the invention, the transforming arrangement is a Fourier lens arrangement. The imaged light is combined with the coherent light to produce an output interference pattern at a light detector, which may be a CCD line-array imager. When the delay line is clocked at a sampling rate, the optical processor may include an ON-OFF control arrangement coupled to the port of the coherent light source, for maintaining the light source in an ON condition for a processing period exceeding one the sampling period, and preferably for maintaining the light source ON with a duty cycle of greater than 50%.

A synthetic aperture radar system according to an aspect of the invention includes a transmitter for transmitting pulses at a rate which defines a pulse-to-pulse interval. A receiver receives returns from targets which reflect the pulses, for generating received signals. An optical processor corresponding to the processor described above is provided, including (a) a line array of light modulator elements, each of the light modulator elements including an input signal port, for controlling light falling thereon under the influence of signal voltage applied to the input signal port of the modulator element; (b) a tapped delay line including an input port coupled to the receiver, and also including a plurality of taps, for generating electrical signals at each of the taps which represent the received signals applied to the input port of the delay line, delayed by a sampling time delay established by the inter-tap delay; and (c) a coupling arrangement including a strobe input port, which coupling arrangement is coupled to the taps of the delay line and to the input signal ports of the array of light modulator elements, for simultaneously sampling the signal occurring at all of the taps under the control of a strobe signal applied to the strobe input port of the coupling arrangement, to thereby generate a plurality of sampled signals, and for applying the sampled signals to the input signal ports of the line array of modulator elements, and holding the value until a later strobe signal is applied to the strobe input port. The processor further includes a coherent light source for producing coherent light under the control of a signal applied to an ON-OFF control port. An arrangement is provided for illuminating the modulator with the coherent light during those times when the coherent light source is ON, as a result of which the modulator modulates the coherent light to produce modulated light. A further arrangement operates on the modulated light for transforming the modulated light to produce transformed light, and for spatially filtering the transformed light to produce filtered transformed light, and for imaging the filtered transformed light to produce imaged light, and for combining the imaged light with the coherent light to produce an output interference pattern. A source of sampling strobe signals is coupled to the strobe input port of the coupling arrangement, for applying the sampling strobe signal to the coupling arrangement at the pulse rate, so that the sampled signals are optically displayed for more than 50% of the transmitted pulse interval, for causing signals applied to the input port of the tapped delay line to be displayed by the line array of light modulator elements.

BRIEF DESCRIPTION OF THE DRAWING

FIG. 2a is an amplitude-time plot of a train of transmit pulses, and FIG. 2b is an amplitude-time plot of the modulation which is superposed upon the transmitted pulses by the terrain in the footprint onto which it is directed, FIG. 2c illustrates display rate or pulse-rate sampling pulses, and FIG. 2d illustrates light-ON pulses which begin just after each pulse of FIG. 2c, and end just before the following pulse of FIG. 2c;

DESCRIPTION OF THE INVENTION

Figure 6:
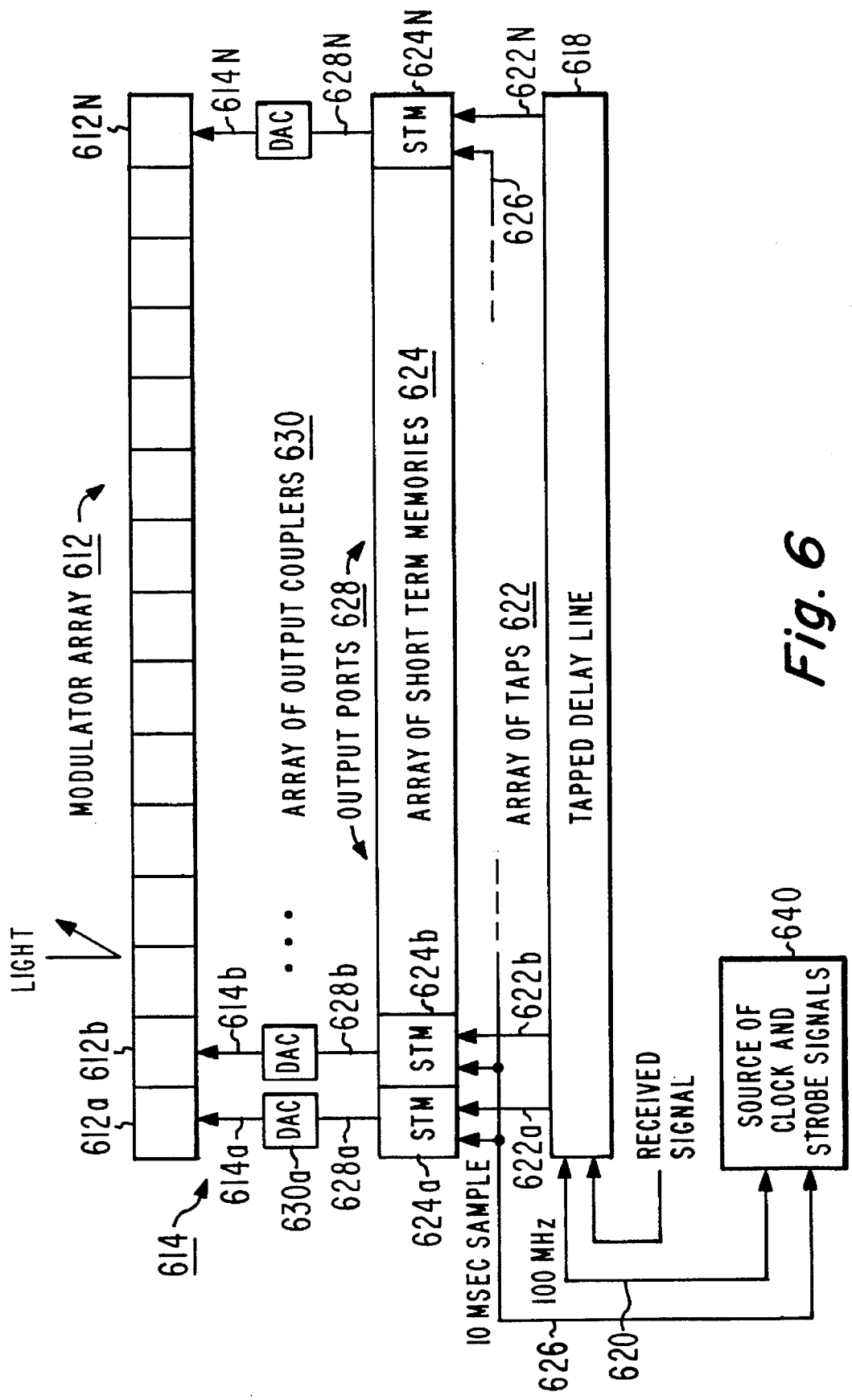
FIG. 6 is a simplified block-diagram representation of an optical modulator according to an aspect of the invention.

In FIG. 6, an optical modulator 610 includes a line array 612 of optical modulator pixels, some of which are designated 612a, 612b, . . . 612N, which are similar to those described in allowed patent application Ser. No. 08/109,550 filed Aug. 20, 1993 now U.S. Pat. No. 5,488,504, in the name of Worchesky et al. As described therein, the modulator is reflective, and each modulator pixel includes a voltage-controllable Fabry-Perot etalon/quantum-well arrangement, and each modulator pixel is driven by an electronic circuit located behind the light modulator. Thus, each modulator pixel of array 622 in the arrangement of FIG. 6 is controlled by an analog voltage individually applied to the pixel over an electrical conductor array 614, including electrical conductors 614a, 614b, . . . 614N. As illustrated in FIG. 6, received electrical analog signal or data is applied over a path 616 to the input end of a tapped delay line 618, which may take the form of a simple electromagnetic transmission line with physical taps along its length, or an acoustic delay line. As an alternative, tapped delay line 618 may take the form of a linear or line array of solid-state "bucket brigade" charge-coupled stages, controlled by a sampling clock signal applied over a sampling clock path 620 from a source 640. In a preferred embodiment of the invention, the transmission line is in the form of an array of shift registers which has a depth of six bits, so that a six-bit digital representation of the received signal amplitude is coupled through the delay line. Regardless of the exact form of the tapped delay line 618, delayed samples are available at each tap 622a, 622b, . . . 622N, of an array 622 of taps, with the signals which appear on mutually adjacent taps separated by the inter-tap duration. The inter-tap duration is, of course, the sampling clock interval in the case of a shift register type tapped delay line. The number of taps, and therefore the number of stages in delay line 618, depends upon the desired resolution, and on the pulse-to-pulse period or interval of the SAR radar system.

Each tap 622a, 622b, . . . 622N of the tapped delay line 618 couples the signal appearing at the tap to a short-term memory 624a, 624b, . . . 624N of an array 624 of short-term memories. Each short-term memory of array 624 samples the signal at its tap under the control of a display-rate sampling clock, which is applied simultaneously by a path 626 to all of the short-term memories of array 624. The display-rate sampling pulse is very short, on the same order of duration as the high-speed sampling clock signal applied to delay line 618 over sample clock path 620. The display-rate pulses are illustrated as 230 of FIG. 2c, and occur about concurrently with the end of transmitted pulses 210. The short-term memory array in the case of a transmission-line type delay line carrying an analog signal, may take the form of an array of capacitive sample-and-hold circuits, and in the case of a digital shift-register type tapped delay line carrying multibit digital signals, may take the form of an array of multibit storage registers, one multibit storage register at each tap. However implemented, the short-term memory 622a, 622b, . . . 622N samples the tap signal at each display clock cycle, and makes the sample available on its output signal path 628a, 628b, . . . 628N of an array 628 of sampled signal ports. Thus, a representation is stored in the array of short-term memories of the pattern of signal which, at the display-rate sampling instant, appears on the delay line. The high-speed clock signal applied over path 620 to tapped delay line 618 may have a frequency of, for example, 100 MHz., while the display-rate clock signal may be a pulse having a duration of less than 10 nanoseconds, recurring at the display refresh rate of, for example, every ten milliseconds (a refresh rate of 100 Hz.).

The output of the array 624 of short-term memories of FIG. 6 is an array of received signals, representing the pattern of received signals which appeared on the tapped delay line at the moment at which the display-rate sampling clock signal occurred. The pattern of received signals is coupled to an array 630 of output coupling devices 630a, 630b, . . . 630N, which couple the array of received signals to the array 612 of modulators. In the case of analog signals sampled by an array 624 of capacitive sample-and-hold circuits, the output coupling may be simply an electrical conductor, and in the case of multibit digital signals stored in digital-register type short-term memories, the output coupling array may be an array of digital-to-analog converters. However implemented, the elements of array 630 couple the sampled received signals from short-term memories 624a, 624b, . . . 624N to the corresponding ones 630a, 630b, . . . 630N of the output coupling arrangements. The coupling arrangements 630a, 630b, . . . 630N, in turn, couple analog signals to their corresponding optical modulator elements 612a, 612b, . . . 612N.

In operation of the arrangement of FIG. 6, the received signals are applied to tapped delay line 618, and propagate therethrough. At a particular instant, namely the display sampling instant established by a pulse 230 of FIG. 2c, the pattern of received signals then appearing on the tapped delay line 618 of FIG. 6 is sampled, and the samples are stored in the short-term memory array 624, and are held therein until the next subsequent display-rate sampling signal. The stored received signals are applied through their respective coupling elements of coupling element array 630 to the optical modulator elements, with the result that the particular pattern of received signals, which appeared on tapped delay line 618 at the moment of the display-rate sample pulse, is transferred to the optical modulator elements 612, and are held there until the next succeeding display-rate sample pulse. Thus, the optical pattern resides in the modulator semi-permanently, notwithstanding the continuous passage of received signal through the tapped delay line, and the continuous change in the pattern of received signal in the delay line. In this context, semipermanent means held until the next following display-rate sampling pulse. The application of the received signals to the array of modulators converts the time sequence of received signals into a spatial sequence of optical modulation.

Figure 1:
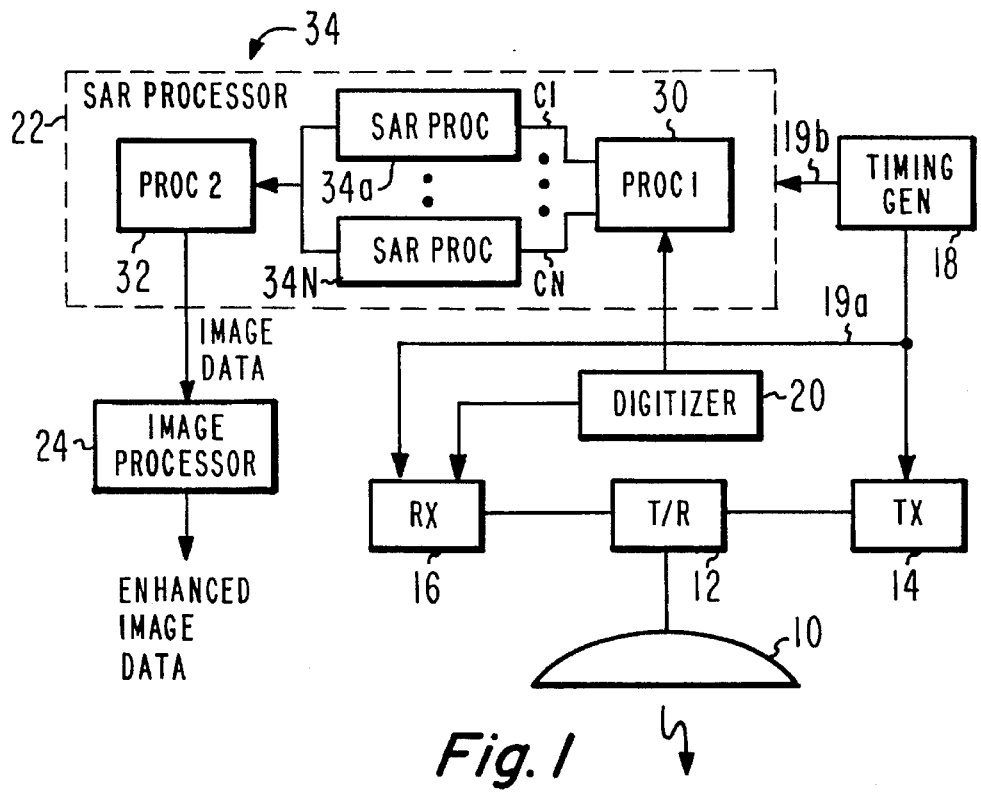
FIG. 1 is a simplified block diagram of a synthetic aperture radar system which is made up of prior-art elements but which does not necessarily represent the prior art.
Figure 3:
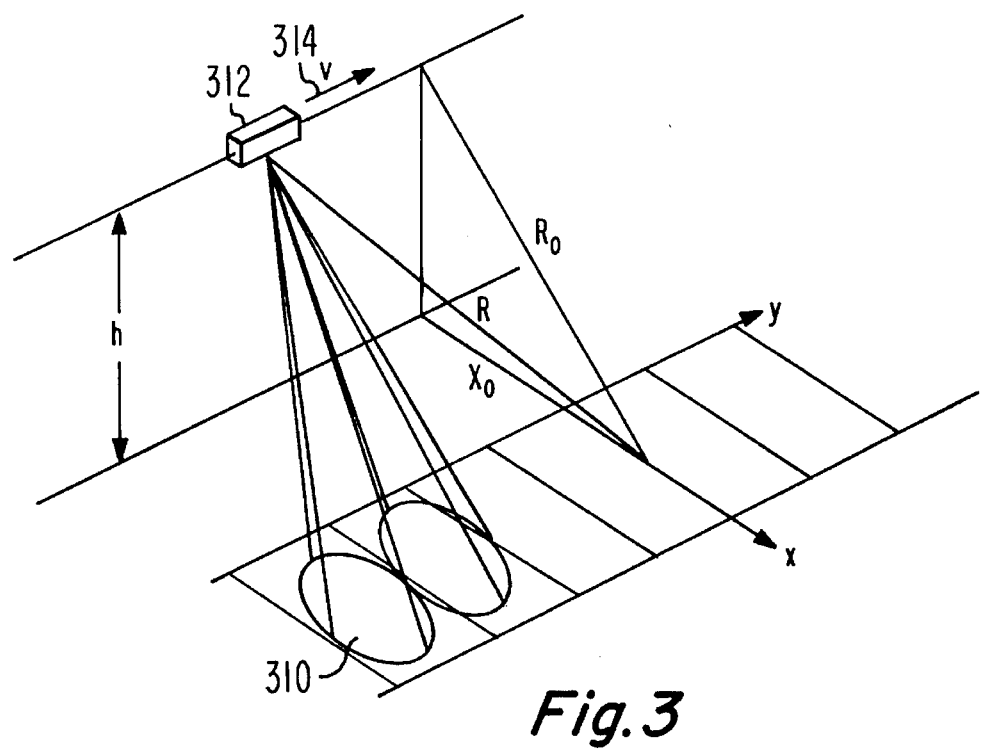
FIG. 3 is a simplified representation of the transmitted energy and its relationship to the target being detected.
Figure 4:
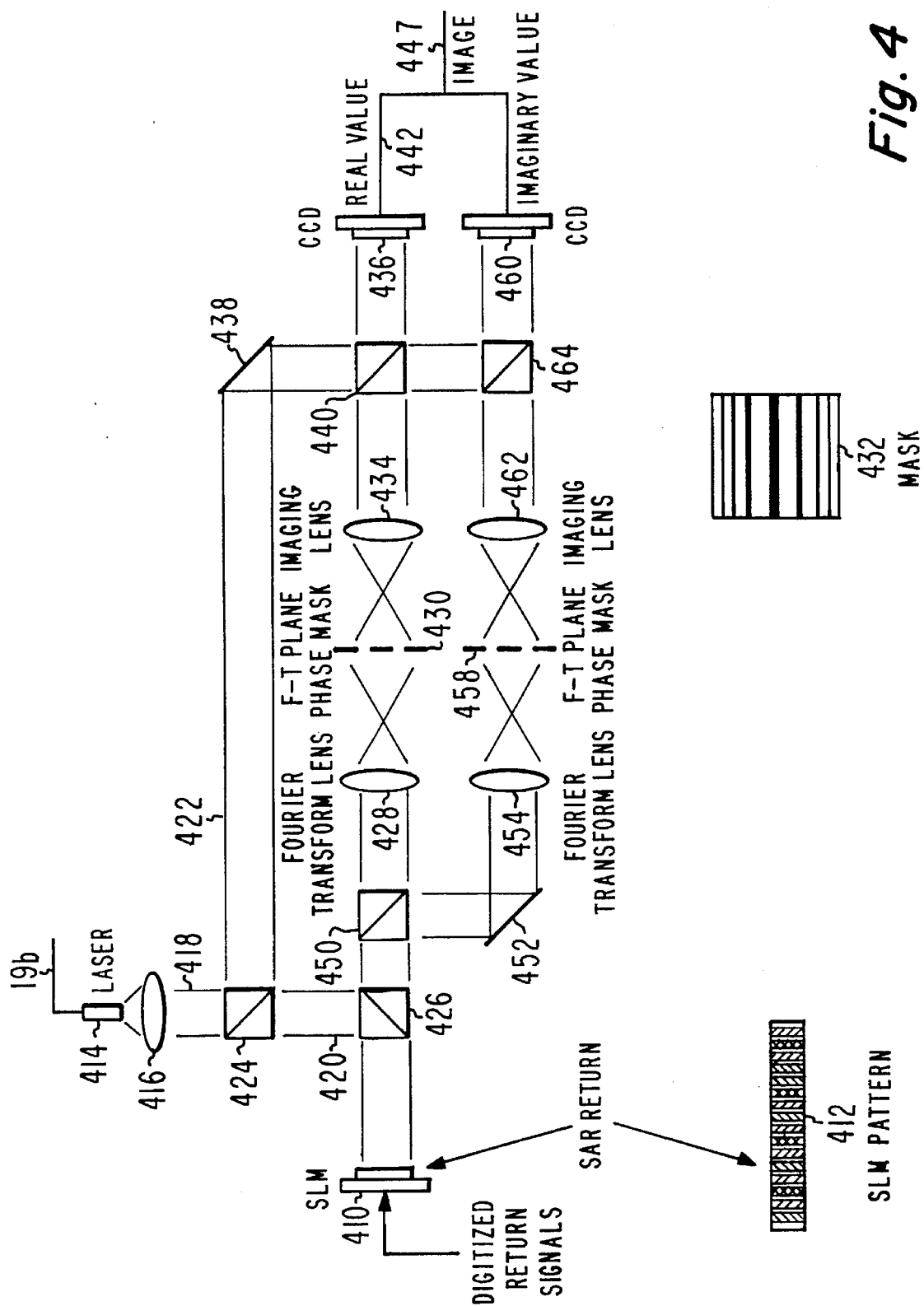
FIG. 4 is a simplified block diagram of an optical SAR processor which may be used in the arrangement of FIG. 1.
Figure 5:
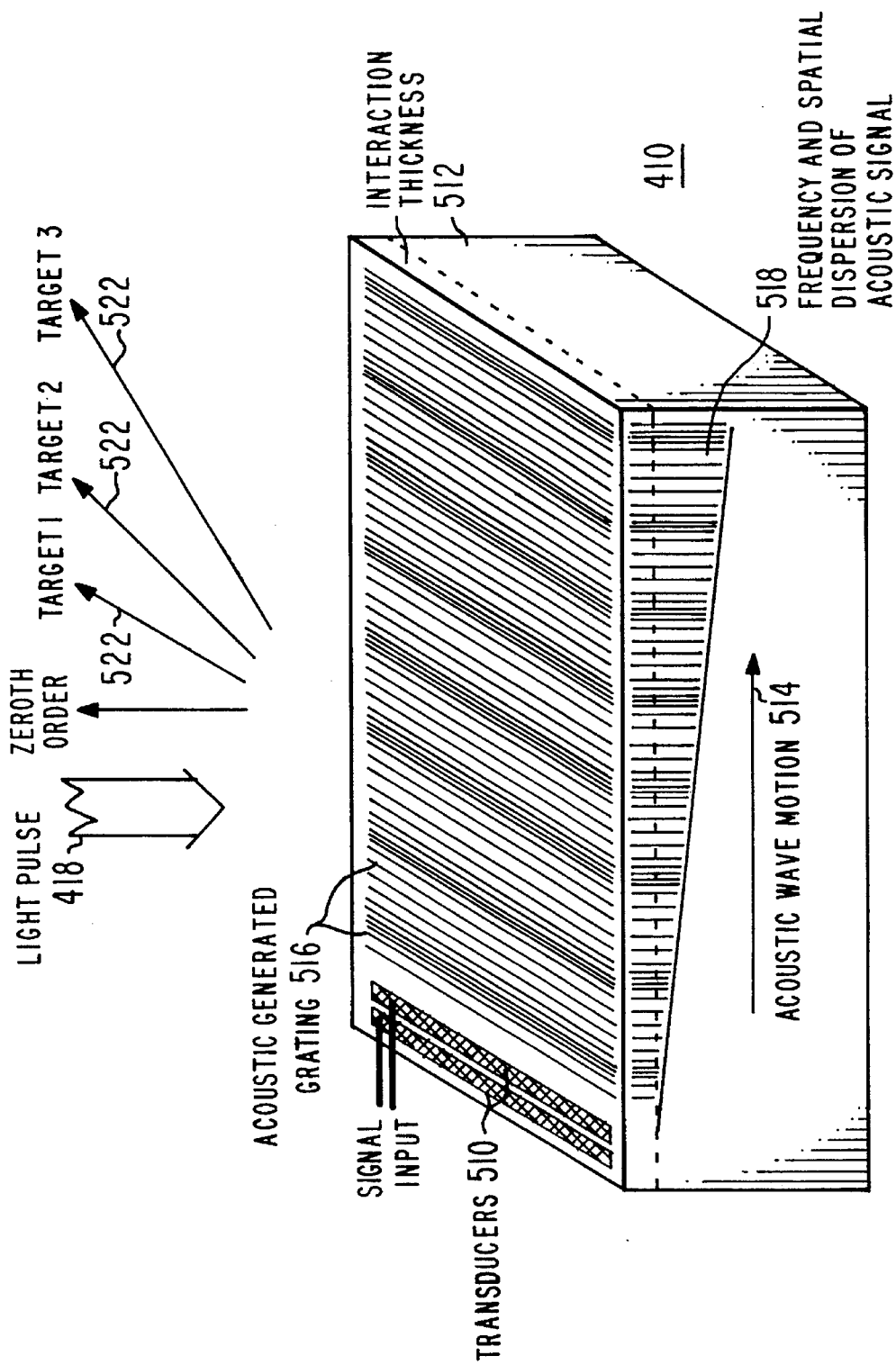
FIG. 5 is a simplified representation of an acoustic surface-wave optical modulator which may be used in the arrangement of FIG. 4.

The semipermanence of the pattern of the received signal at the outputs of the short-term memories 624a, 624b, . . . , 624N of array 624 of short-term memories makes it possible to improve the optical signal processing described in conjunction with FIG. 4. Referring once again to FIG. 4, it will be recalled that one of the problems which resulted from the use of the acoustic optical modulator of FIG. 5 was that the desired pattern of the received signal was transitory, existing in the modulator for only a fraction of a cycle at the highest design frequency of operation. As a result, the optical processing could take place only at that instant, and the laser was therefore pulsed for only a short time. This short time, in turn, required complex laser controls, and resulted in poor signal-to-noise ratio at the output of the processor. According to an aspect of the invention, the arrangement of FIG. 6, when used in an optical processor such as that of FIG. 4, has the major advantage that the received signal pattern available for optical processing is semipermanent, rather than transitory. Since the pattern of received signal is stored in the short-term memories 624, it is available to the optical modulator elements for the full duration of the pulse-to-pulse interval of the radar system. This availability, in turn, means that the coherent light source can remain illuminated for a period of time much greater than in the arrangement of FIG. 4, and the signal-to-noise ratio of the resulting processed optical signal is much improved. Referring now to FIG. 2c, display-rate pulses 230 are timed to occur about coincident with the lagging or trailing edges of transmit pulses 210 of FIG. 2a, and are applied to short-term memories 624 of FIG. 4 by way of signal path 626. Pulses 230 have a very short duration, as mentioned above, which may be on the order of less than ten nanoseconds, for causing the short-term memories to sample the signal then appearing on the tapped delay line. Pulses 240 of FIG. 2d represent the coherent light ON pulses which are applied over signal path 19b of FIG. 4 to illuminate the coherent light source 414, to implement the optical processing, and are timed to begin slightly after the end of a display-rate pulse 230, and to end just before the next following display-rate pulse 230. By contrast, the duration of the light pulse which would be appropriate for use with an acoustic modulator, such as that of FIG. 5, in an optical processor such as that of FIG. 4, would be approximately the same as the duration of pulses 230 of FIG. 2c, which is much smaller than the duration of pulses 240.

Other embodiments of the invention will be apparent to those skilled in the art. For example, digital signals may have any number of bits rather than the six bits described. The light modulator may be transmissive rather than reflective because it is a line array and not a two-dimensional array. The light modulator elements may be fabricated in any form, and need not use Fabry-perot etalons or quantum wells in the modulator elements.

What is claimed is:

1. A light modulator, comprising:

a line array of light modulator elements, each of said light modulator elements including an input signal port, for controlling light falling thereon under the influence of a signal voltage applied to said input signal port of said modulator element;

a tapped delay line including an input port coupled to a source of electrical signal to be displayed, and also including a plurality of taps, for generating electrical signals at each of said taps which represent said signals applied to said input port of said delay line, delayed by a particular time delay;

coupling means including a strobe input port, said coupling means being coupled to said taps of said delay line and to said input signal ports of said array of light modulator elements, for sampling the signal occurring at all of said taps under the control of a strobe signal applied to said strobe input port of said coupling means, to thereby generate a plurality of sampled signals, and for applying said sampled signals to said input signal ports of said line array of modulator elements until a later strobe signal is applied to said strobe input port;

a source of strobe signals coupled to said strobe input port of said coupling means, for periodically applying said strobe signal to said coupling means, for causing signals applied to said input port of said tapped delay line to be displayed by said line array of light modulator elements.

2. A modulator according to claim 1, wherein said delay line is analog.

3. A modulator according to claim 2, wherein said analog delay line comprises an array of charge-coupled devices.

4. A modulator according to claim 2, wherein said delay line comprises an electromagnetic transmission line.

5. A modulator according to claim 1, wherein said delay line is digital.

6. A modulator according to claim 5, wherein said delay line comprises a shift register.

7. A modulator according to claim 1, wherein said modulator comprises a Fabry-Perot cavity modulator.

8. A modulator according to claim 7, wherein said modulator is a reflective modulator.

9. A modulator according to claim 7, wherein said modulator comprises quantum wells.

10. A modulator according to claim 1, wherein said coupling means comprises a plurality of sample-and-hold means.

11. A modulator according to claim 10, wherein each of said sample-and-hold means comprises capacitance means.

12. A modulator according to claim 1, wherein said delay line comprises an array of shift registers arranged so that a each tap produces a multibit digital signal,; and wherein said coupling means comprises (a) an array of further registers for storing said sampled signal, and (b) digital-to-analog conversion means coupled to each of said further registers, for converting said bits of said sampled signal into analog form for application to said modulator.

13. An optical processor, comprising:

a light modulator, comprising:

(a) a line array of light modulator elements, each of said light modulator elements including an input signal port, for controlling light falling thereon under the influence of a signal voltage applied to said input signal port of said modulator element;

(b) a tapped delay line including an input port coupled to a source of electrical signal to be displayed, and also including a plurality of taps, for generating electrical signals at each of said taps which represent said signals applied to said input port of said delay line, delayed by a sampling time delay; and (c) coupling means including a strobe input port, said coupling means being coupled to said taps of said delay line and to said input signal ports of said array of light modulator elements, for sampling the signal occurring at all of said taps under the control of a strobe signal applied to said strobe input port of said coupling means, to thereby generate a plurality of sampled signals, and for applying said sampled signals to said input signal ports of said line array of modulator elements until a later strobe signal is applied to said strobe input port;

said processor further comprising:

a coherent light source for producing coherent light, and including an ON-OFF control port;

means for illuminating said modulator with said coherent light when said coherent light source is ON, whereby said modulator modulates said coherent light to produce modulated light; and means for transforming said modulated light to produce transformed light, spatially filtering said transformed light to produce filtered transformed light, and imaging said filtered transformed light to produce imaged light, and for combining said imaged light with said coherent light to produce an output interference pattern.

14. A processor according to claim 13, further comprising a camera for generating electrical signals representative of said interference pattern.

15. A processor according to claim 13, further comprising ON-OFF control means coupled to said port of said coherent light source, for maintaining said light source in an ON condition for a processing period exceeding one said sampling period.

16. A synthetic aperture radar system, comprising:

transmitting means for transmitting pulses at a rate which defines a pulse-to-pulse interval;

receiving means for receiving returns from said pulses, for generating received signals representing targets;

an optical processor, comprising:

a light modulator, including (a) a line array of light modulator elements, each of said light modulator elements including an input signal port, for controlling light falling thereon under the influence of signal voltage applied to said input signal port of said modulator element;

(b) a tapped delay line including an input port coupled to said receiving means, and also including a plurality of taps, for generating electrical signals at each of said taps which represent said received signals applied to said input port of said delay line, delayed by a sampling time delay; and (c) coupling means including a strobe input port, said coupling means being coupled to said taps of said delay line and to said input signal ports of said array of light modulator elements, for sampling the signal occurring at all of said taps under the control of a strobe signal applied to said strobe input port of said coupling means, to thereby generate a plurality of sampled signals, and for applying said sampled signals to said input signal ports of said line array of modulator elements until a later strobe signal is applied to said strobe input port;

said processor further comprising a coherent light source for producing coherent light, and including an ON-OFF control port;

means for illuminating said modulator with said coherent light when said coherent light source is ON, whereby said modulator modulates said coherent light to produce modulated light;

means for transforming said modulated light to produce transformed light, spatially filtering said transformed light to produce filtered transformed light, and imaging said filtered transformed light to produce imaged light, and for combining said imaged light with said coherent light to produce an output interference pattern; and a source of strobe signals coupled to said strobe input port of said coupling means, for applying said strobe signal to said coupling means at said pulse rate, for more than 50% of said inter-pulse interval, for causing signals applied to said input port of said tapped delay line to be displayed by said line array of light modulator elements.

* * * * *